US011062595B1

(12) United States Patent
Trim et al.

(10) Patent No.: US 11,062,595 B1
(45) Date of Patent: Jul. 13, 2021

(54) COGNITIVE DATA ANALYTICS FOR COMMUNICATION BETWEEN VEHICULAR DEVICES USING A TELECOMMUNICATIONS NETWORK

(71) Applicant: International Business Machines Corporation, Armonk, NY (US)

(72) Inventors: Craig M. Trim, Ventura, CA (US); Lakisha R. S. Hall, Upper Marlboro, MD (US); Gandhi Sivakumar, Bentleigh (AU); Kushal Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/817,953

(22) Filed: Mar. 13, 2020

(51) Int. Cl.
*G08G 1/09* (2006.01)
*G08G 1/01* (2006.01)
*H04W 4/40* (2018.01)
*G16Y 40/10* (2020.01)

(52) U.S. Cl.
CPC ......... *G08G 1/0141* (2013.01); *G08G 1/0112* (2013.01); *H04W 4/40* (2018.02); *G16Y 40/10* (2020.01)

(58) Field of Classification Search
CPC .................................................. G08G 1/0141
USPC ............ 340/905, 917, 921, 998–995.2, 903; 701/301; 342/455
See application file for complete search history.

(56) References Cited

U.S. PATENT DOCUMENTS

| 4,984,163 A | 1/1991 | Kuwana |
| 5,487,006 A | 1/1996 | Kakizaki |
| 5,991,427 A | 11/1999 | Kakinami |
| 7,047,130 B2 | 5/2006 | Watanabe |
| 8,818,725 B2 | 8/2014 | Ricci |

(Continued)

FOREIGN PATENT DOCUMENTS

WO 2017133769 A1 8/2017

OTHER PUBLICATIONS

"5G network to improve road safety", Phys.org, VTT Technical Research Centre of Finland, Dec. 6, 2018, 3 pages, <https://phys.org/news/2018-12-5g-network-road-safety.html>.

(Continued)

*Primary Examiner* — Tai T Nguyen
(74) *Attorney, Agent, or Firm* — Michael A. Petrocelli

(57) ABSTRACT

The present disclosure includes using cognitive data analytics for communication between vehicular devices using a 5G (fifth generation cellular network technology) telecommunications network. In a defined area, using an Internet of Things (IoT) enabled device in a first vehicle traveling in a direction, the present disclosure detects a second vehicle traveling in another direction in the defined area. Data is collected in the defined area using the detected IoT devices in the first and second vehicles. The collected data is analyzed to provide content data related to driving conditions for the first and second vehicles. The content data is exchanged between the IoT devices of the first vehicle and the second vehicle in the defined area, thereby providing real-time information related to the driving conditions to a vehicle traveling in another direction, and the exchanging of the content data, using the service orchestration layer of the 5G telecommunications network.

20 Claims, 8 Drawing Sheets

(56) References Cited

U.S. PATENT DOCUMENTS

| | | | |
|---|---|---|---|
| 2002/0198660 A1* | 12/2002 | Lutter | G08G 1/0965 |
| | | | 701/301 |
| 2005/0132024 A1 | 6/2005 | Habaguchi | |
| 2010/0331023 A1 | 12/2010 | Cai | |
| 2016/0169688 A1* | 6/2016 | Kweon | G08G 1/162 |
| | | | 701/522 |
| 2018/0295655 A1 | 10/2018 | Cavalcanti | |
| 2018/0339714 A1 | 11/2018 | Smid | |
| 2019/0004179 A1 | 1/2019 | Hwang | |
| 2019/0215670 A1 | 7/2019 | Ameixieira | |
| 2020/0082303 A1* | 3/2020 | Kim | G01C 21/3438 |
| 2020/0327804 A1* | 10/2020 | Xu | G08G 1/096811 |

OTHER PUBLICATIONS

"Watson Speech to Text—Overview", IBM Cloud, printed Dec. 19, 2019, 4 pages, <https://www.ibm.com/cloud/watson-speech-to-text>.

Garcia, et al., "Vehicle Detection Based on Laser Radar", International Conference on Computer Aided Systems Theory—EUROCAST 2009, pp. 391-397, <https://link.springer.com/chapter/10.1007%2F978-3-642-04772-5_51#enumeration>.

Mell et al., "The NIST Definition of Cloud Computing", National Institute of Standards and Technology, Special Publication 800-145, Sep. 2011, 7 pages.

\* cited by examiner

COGNITIVE DATA ANALYTICS FOR COMMUNICATION BETWEEN VEHICULAR DEVICES USING A TELECOMMUNICATIONS NETWORK

BACKGROUND

The present disclosure relates to cognitive data analytics for communication between vehicular devices using a telecommunications network, and more particularly, the present disclosure relates to communications between Internet of Things (IoT) enabled vehicular devices in 5G (fifth generation cellular network technology) telecommunications networks.

5G (fifth generation cellular network technology) refers to a system using "5G NR" (5G New Radio) software as "5G". 5G can be defined as telecommunications networks that meet the requirements of the ITU IMT-2020 (International Mobile Telecommunications-2020 (IMT-2020 Standard)). The requirements are issued by the (International Telecommunication Union) ITU Radiocommunication Sector (ITU-R) of the International Telecommunication Union (ITU) for 5G networks, devices and services.

Telecommunication technology has pushed current technologies to an upper stratum by parallelizing a physical channel, resulting in a higher bandwidth.

SUMMARY

The present disclosure recognizes the shortcomings and problems associated with current systems for delivering data in telecommunications networks, especially in vehicular devices using a 5G telecommunications network.

Advancements in the telecommunication industry has further enabled technologies including Artificial Intelligence (AI) provide further services. The 5G telecommunications technology may serve to push dependent technologies to a higher level, that is, an upper stratum by parallelizing the physical channel, and thus higher bandwidth, through mobility bandwidth of 1 GBPS (Gigabytes per second), convergence of IoT (Internet of Things) device access, etc.

The 5G telecommunications technology can serve as a rich enabler to push dependent technologies to a higher level through mobility bandwidth of 1 GBPS (Gigabytes per second), convergence of IoT device access, etc. One feature of 5G is the network itself being Intelligent and cognitive.

5G telecommunications can include Ultra-Reliable Low Latency Connectivity (URLLC) which addresses time-sensitive and secure messaging delivery. URLCC application to smart grids can streamline processes to detect and mitigate problems. Ultra-Reliable Low Latency Connectivity (URLLC) can help autonomous vehicles to communicate with each other using wireless communications to utilize real time data to make smart decisions, for example, when approaching intersections or potential hazards. The present invention can include a device or apparatus and associated method to observe and collect real-time information from IoT enabled devices and vehicles in motion, and provides insights, suggestions, or provide data driven information for traveling the road ahead based on the information. The methodology of the present invention can include data collection methodology from vehicles on the road coming from opposite direction to analyze and provide inference/suggestions or data driven information for a situation ahead on the road for a vehicle in motion. The device and method of the present invention can collect information from IoT enabled devices in a service orchestration layer of a 5G telecommunication network, and provide deeper insights while driving or for handling or management of a self-driving vehicle on the road. The device and method of the present invention provides cognition amplification in real-time information from IoT enabled devices and vehicles in motion, and can provide analysis, suggestions, data driven information, and insights for the road ahead for a vehicle traveling the road using the real-time information.

In one aspect according to the present invention, a computer implemented method includes cognitive data analytics for communication between vehicular devices using a 5G (fifth generation cellular network technology) telecommunications network. The method including detecting, in a defined area, using an Internet of Things (IoT) enabled device, having a computer, in a first vehicle traveling in a direction, a second vehicle traveling in another direction in the defined area. Data is collected in the defined area using the detected IoT devices in the first and second vehicles, using a service orchestration layer of a 5G telecommunications network. The method includes analyzing the collected data to provide content data related to driving conditions for the first and second vehicles. The content data is exchanged between the IoT devices of the first vehicle and the second vehicle in the defined area, at least from the first vehicle to the second vehicle, in real-time, thereby providing real-time information related to the driving conditions to a vehicle traveling in another direction, the exchanging of the content data, using the service orchestration layer of the 5G telecommunications network. The method includes communicating the content data to a user of at least one of the first or second vehicles.

In a related aspect according to the present invention, the user is a driver of the first or the second vehicles, or a controller of the first or second vehicles wherein at least one of the first and second vehicles is an autonomous vehicle.

In a related aspect according to the present invention, the real-time exchange of content data includes the first vehicle and the second vehicle being in the defined area.

In a related aspect according to the present invention, the another direction is an opposite direction from the direction of the first vehicle.

In a related aspect according to the present invention, the method further includes collecting data related to the geography, location of vehicles, local news, and data collected from IoT devices coming from the opposite direction of the first vehicle, using the service orchestration layer of the 5G telecommunications network.

In a related aspect according to the present invention, the content data related to the driving conditions includes road conditions and driving conditions in the defined area.

In a related aspect according to the present invention, the method includes: detecting, in the defined area, using the computer, Internet of Things (IoT) enabled devices in first vehicles traveling in the direction and second vehicles traveling in the another direction at the defined area; exchanging the content data with vehicles capable of receiving the content in both directions in the defined area, thereby providing real-time information related to driving conditions for the first and second vehicles; and communicating the content data to drivers of respective first and/or second vehicles or respective users of autonomous vehicles.

In a related aspect according to the present invention, vehicular devices including computers are located in respective vehicles and communicate with a remote computer.

In a related aspect according to the present invention, the vehicular devices are at least part of respective navigations systems in respective vehicles.

In a related aspect according to the present invention, the method includes: initiating an evasive action based on the content data, in response to the communicating of the content data to a driver or a user of at least one of the first or second vehicles or a user of an autonomous vehicle.

In a related aspect according to the present invention, the evasive action is initiated by the driver or the user.

In a related aspect according to the present invention, the driver is a person physically located in the vehicle seated behind the wheel of the first or the second vehicle.

In another aspect according to the present invention, the present disclosure includes a system for cognitive data analytics for communication between vehicular devices using a 5G (fifth generation cellular network technology) telecommunications network which includes a computer system comprising: a computer processor, a computer-readable storage medium, and program instructions stored on the computer-readable storage medium being executable by the processor, to cause the computer system to perform functions, by the computer, comprising the functions to: detect, in a defined area, using an Internet of Things (IoT) enabled device, having a computer, in a first vehicle traveling in a direction, a second vehicle traveling in another direction in the defined area; collect data in the defined area using the detected IoT devices in the first and second vehicles, using a service orchestration layer of a 5G telecommunications network; analyze the collected data to provide content data related to driving conditions for the first and second vehicles; exchange the content data between the IoT devices of the first vehicle and the second vehicle in the defined area, at least from the first vehicle to the second vehicle, in real-time, thereby providing real-time information related to the driving conditions to a vehicle traveling in another direction, the exchanging of the content data, using the service orchestration layer of the 5G telecommunications network; and communicate the content data to a user of at least one of the first or second vehicles.

In a related aspect according to the present invention, the user is a driver of the first or the second vehicles, or a controller of the first or second vehicles wherein at least one of the first and second vehicles is an autonomous vehicle.

In a related aspect according to the present invention, the real-time exchange of content data includes the first vehicle and the second vehicle being in the defined area.

In a related aspect according to the present invention, the another direction is an opposite direction from the direction of the first vehicle.

In a related aspect according to the present invention, the system further comprising collecting data related to the geography, location of vehicles, local news, and data collected from IoT devices coming from the opposite direction of the first vehicle, using the service orchestration layer of the 5G telecommunications network.

In a related aspect according to the present invention, the content data related to the driving conditions includes road conditions and driving conditions in the defined area.

In a related aspect according to the present invention, the system further comprising: detecting, in the defined area, using the computer, Internet of Things (IoT) enabled devices in first vehicles traveling in the direction and second vehicles traveling in the another direction at the defined area; exchanging the content data with vehicles capable of receiving the content in both directions in the defined area, thereby providing real-time information related to driving conditions for the first and second vehicles; and communicating the content data to drivers of respective first and/or second vehicles or respective users of autonomous vehicles.

In another aspect according to the present invention, a computer program product is provided for cognitive data analytics for communication between vehicular devices using a 5G (fifth generation cellular network technology) telecommunications network. The computer program product comprises a computer readable storage medium having program instructions embodied therewith, the program instructions executable by a computer to cause the computer to perform functions, by the computer, comprising the functions to: detect, in a defined area, using an Internet of Things (IoT) enabled device, having a computer, in a first vehicle traveling in a direction, a second vehicle traveling in another direction in the defined area; collect data in the defined area using the detected IoT devices in the first and second vehicles, using a service orchestration layer of a 5G telecommunications network; analyze the collected data to provide content data related to driving conditions for the first and second vehicles; exchange the content data between the IoT devices of the first vehicle and the second vehicle in the defined area, at least from the first vehicle to the second vehicle, in real-time, thereby providing real-time information related to the driving conditions to a vehicle traveling in another direction, the exchanging of the content data, using the service orchestration layer of the 5G telecommunications network; and communicate the content data to a user of at least one of the first or second vehicles.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

5G (fifth generation cellular network technology) refers to any system using "5G NR" (5G New Radio) software as "5G". 5G can be defined as telecommunications networks that meet the requirements of the ITU IMT-2020 (International Mobile Telecommunications-2020 (IMT-2020 Standard)). The requirements are issued by the (International Telecommunication Union) ITU Radiocommunication Sector (ITU-R) of the International Telecommunication Union (ITU) for 5G networks, devices and services.

Figure 1:
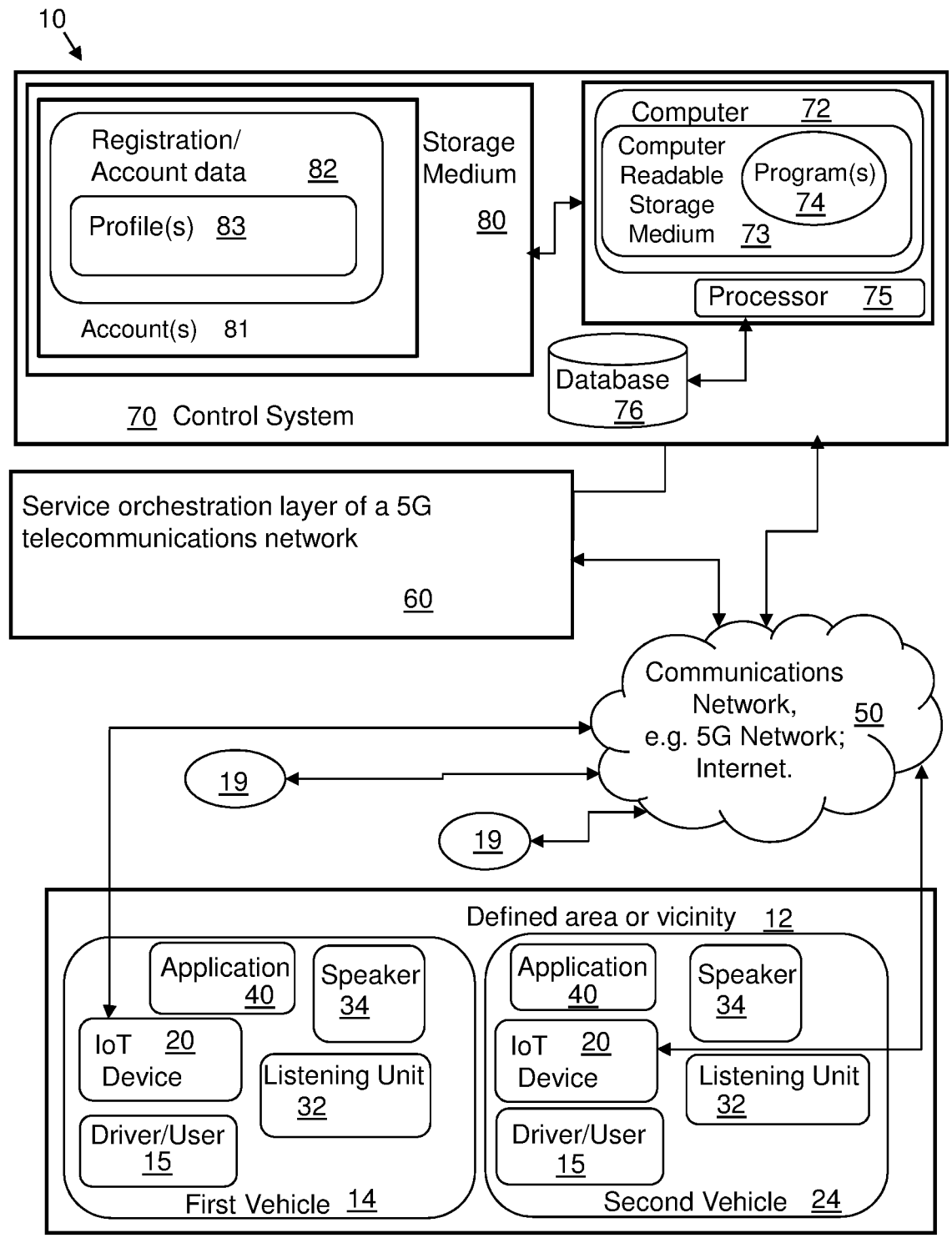
FIG. 1 is a schematic block diagram illustrating an overview of a system and methodology for cognitive data analytics for vehicular devices using a 5G (fifth generation cellular network technology) telecommunications network, according to an embodiment of the invention.
Figure 2:
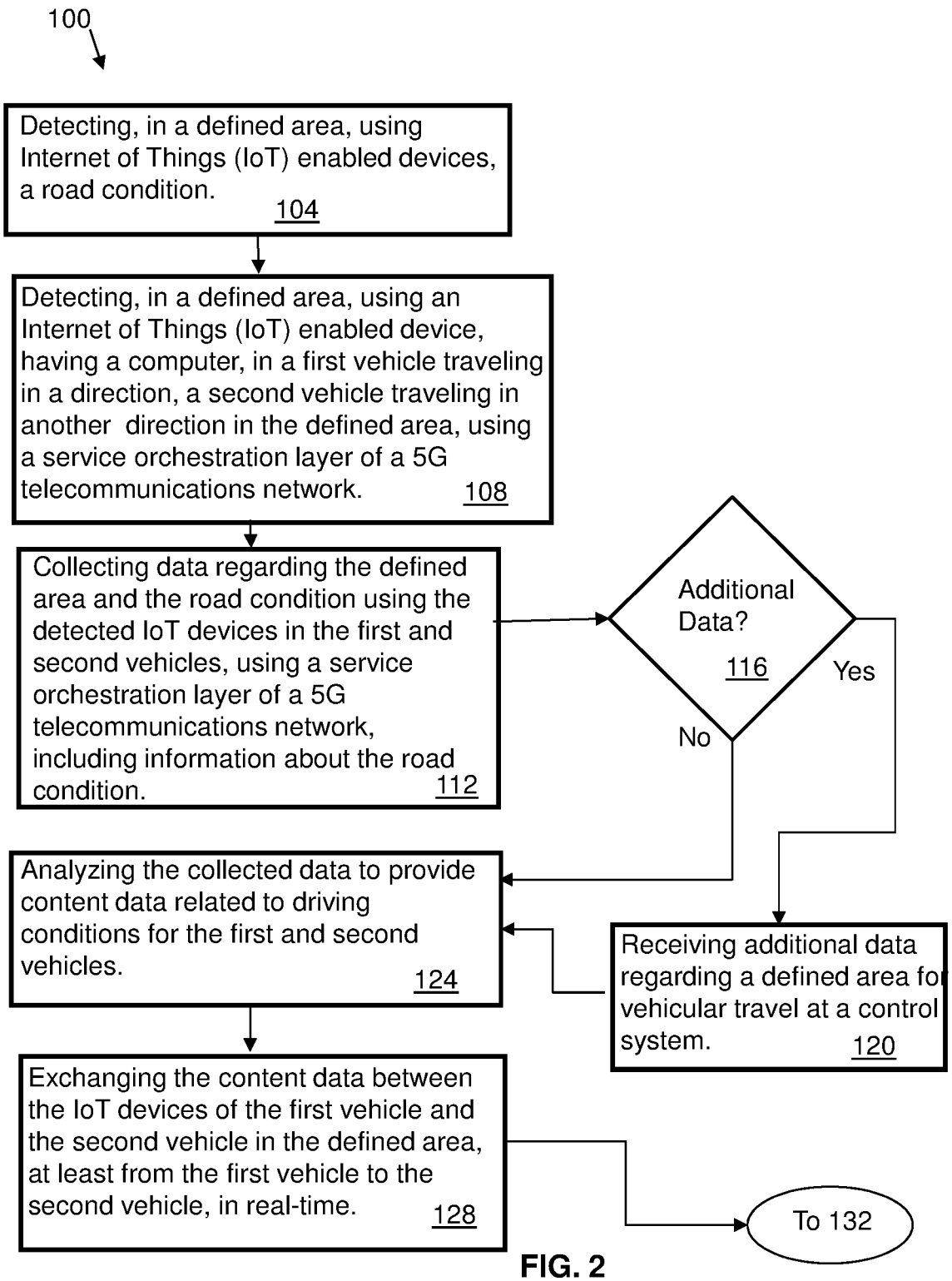
FIG. 2 is a flow chart illustrating a method, implemented using the system shown in FIG. 1, for cognitive data analytics for vehicular devices using a 5G (fifth generation cellular network technology) telecommunications network, according to an embodiment of the present invention.

Referring to FIGS. 1 and 2, a method 100 (FIG. 2) with reference to a system 10 (FIG. 1) according to an embodiment of the present disclosure is provided for data delivery to vehicular devices using a telecommunications network, for example, a 5G (fifth generation cellular network technology) telecommunications network 50. The method 100 includes receiving data regarding a defined area for vehicular travel, from Internet of Things (IoT) enabled devices of vehicles in the defined area. The defined area can be in the vicinity of a moving vehicle and thus the defined area moves as the vehicle moves.

In one embodiment the method can include receiving the data at a vehicle in the defined area, such as a first vehicle 14 or and second vehicle 24. And in another embodiment the method can receive the data at a control system 70 from a vehicle. In another example, data can be received from a combination of a control system and one or more vehicles. In one example, the control system 70 can be all or part of a navigation system, and in one example the navigation system can have a front-end computer in a vehicle and a back-end computer embodied as a control system. In another example, the control system 70 can be all or part of an Artificial Intelligence (AI) system.

Thus, the vehicular devices can include computers located in respective vehicles and communicate with a remote computer, and in another example, the vehicular devices can at least be part of respective navigations systems in respective vehicles.

Figure 5:
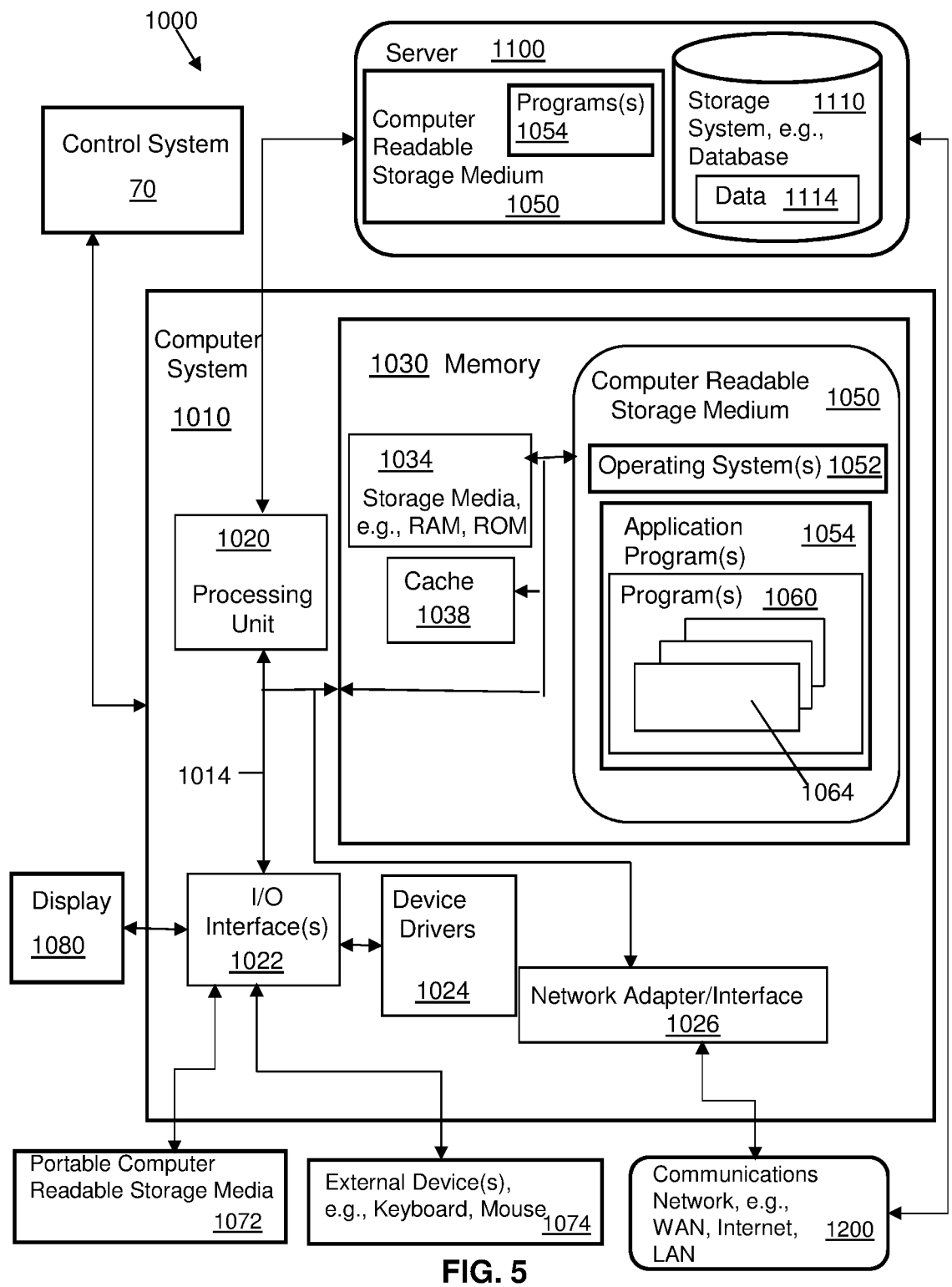
FIG. 5 is a schematic block diagram depicting a computer system according to an embodiment of the disclosure which may be incorporated, all or in part, in one or more computers or devices shown in FIG. 1, and cooperates with the systems and methods shown in FIGS. 1, 2 and 3.

Referring to FIGS. 1 and 2, the first vehicle includes an IoT device 20 which includes a computer (not shown in FIG. 1) and can have an application 40 stored on a computer readable medium (not shown in FIG. 1). Such generic components are shown in FIG. 5 in one embodiment of a computer system and described therein. The first vehicle 14 can also include a speaker 34 for communicating audibly to a driver or user 15 of the vehicle, and a listening device 32 for receiving audio input from a driver or user. Similarly, the second vehicle includes an IoT device 20 which includes a computer (not shown in FIG. 1) and can have an application 40 stored on a computer readable medium (not shown in FIG. 1). Also, the second vehicle 24 can include a speaker 34 for communicating audibly to a driver or user 15 of the vehicle, and a listening device 32 for receiving audio input from a driver or user.

The method 100 according to an embodiment of the present disclosure, can be incorporated in one or more computer programs or an application and stored on an electronic storage medium. The application can be stored, all or in part, on a computer in a vehicle and/or at a control system communicating with the vehicle. It is envisioned that the application can access all or part of instructions necessary to implement the method of the present disclosure. The program or application can communicate with a remote computer system via a communications network 50 (e.g., the 5G network, and in another example the Internet) and access data, and cooperate with program(s) stored on the remote computer system. Such interactions and mechanisms are described in further detail herein and referred to regarding components of a computer system, such as computer readable storage media, which are shown in one embodiment in FIG. 5 and described in more detail in regards thereto referring to one or more computer systems 1010.

In one example, a control system is in communication with the IoT device 20 and a 5G network infrastructure 60. In one example, the device 20 can includes the application 40. The device 20 communicates with the 5G network infrastructure 60 and the control system 70 using the communications network 50 (e.g. the 5G network).

Also, referring to FIG. 1, the IoT device 20, e.g., a navigation system, can include a computer, computer readable storage medium, and operating systems, and/or programs, and/or a software application. These generic features are shown herein in an embodiment of a computer system shown in FIG. 5 referring to one or more computer systems 1010.

The method according the present disclosure includes an IoT device in vehicle, or a control system communicating with the device in the vehicle, detecting other IoT devices in vehicles traveling in a vicinity. The vicinity being an area through which the vehicles are traveling. As such, as the vehicles travel, the vicinity moves in concert with the vehicles.

The method also including detecting, in a defined area, using a computer, Internet of Things (IoT) enabled devices in vehicles, such that the vehicles are detecting and able to communicate with each other using the IoT devices. Such detecting and communicating includes vehicles traveling in one direction and vehicles traveling in another direction, including an opposite direction. For example, the method includes detecting, in a defined area or vicinity 12, using Internet of Things (IoT) enabled devices, a road condition, as in block 104. For example, a first vehicle can detect a road condition 224 (Shown in FIG. 4) on either side of a road, that is the same side where the first vehicle is traveling or where vehicles are traveling in the opposite direction or in another direction from the first vehicle. The detection can be implemented for example, using one or more cameras, sensors, navigation devices, in or on the vehicle and/or satellite communication assistance. Such a road condition 224, which can also be referred to as a road environmental condition, for example, can include an object on the road, including an animal, or an inanimate object. Other road conditions can include other vehicles on the road, stopped on the road, or involved in an accident. The road conditions can be on the road traveled by the vehicle or on the road being traveled in the opposite direction or another direction. In one example, the opposite direction is 180 degrees from the direction of the first vehicle. The another direction can include the opposite direction from the direction of the first vehicle, or a direction at an angle from the direction of the first vehicle, for example, a thirty degree angle.

Figure 4:
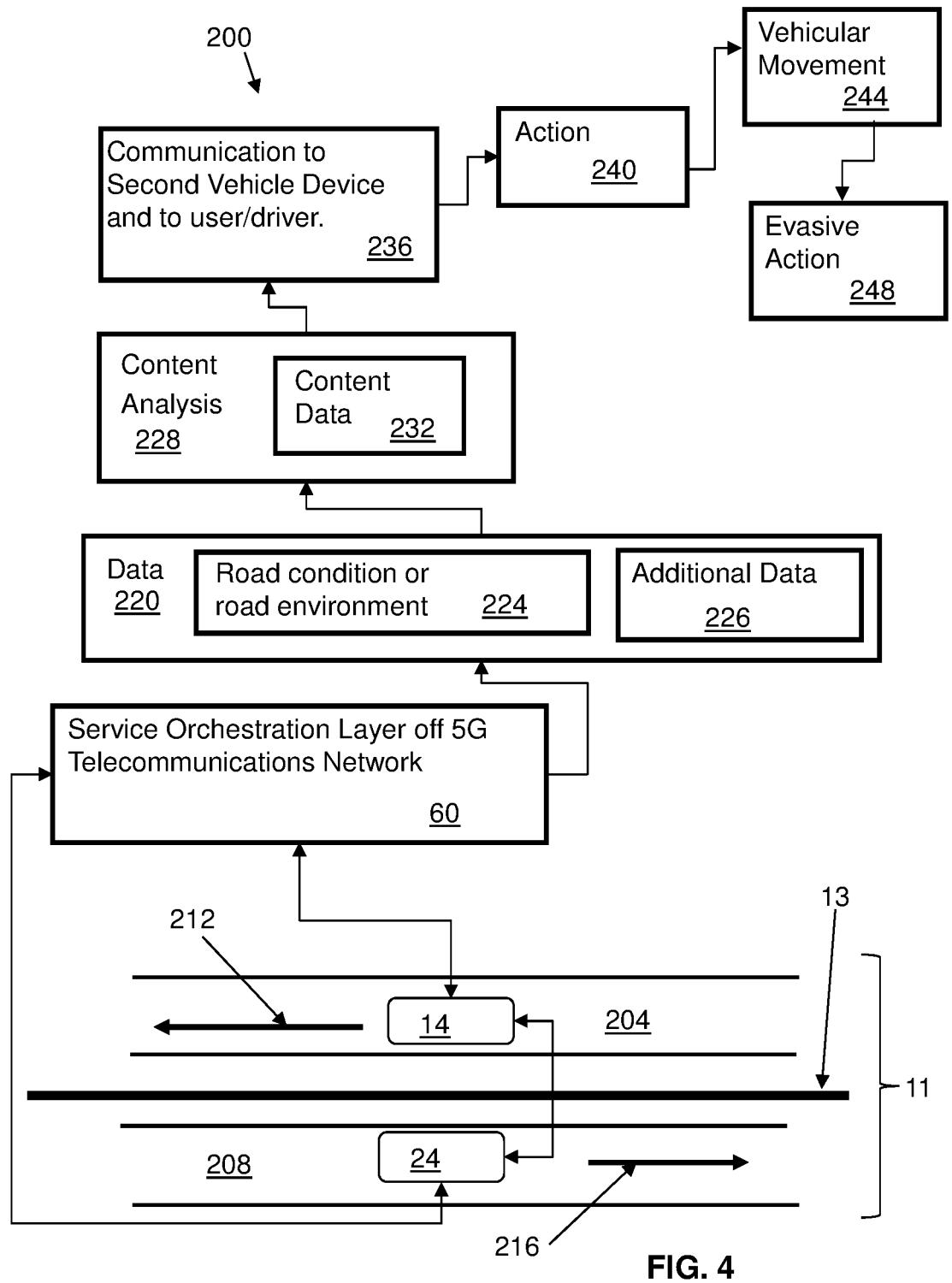
FIG. 4 is a functional schematic block diagram for instructional purposes illustrating features of the present invention in association with the embodiments shown in FIGS. 1, 2, and 3, for cognitive data analytics for vehicular devices using a 5G (fifth generation cellular network technology) telecommunications network, according to embodiments of the invention.

In one example, shown in FIG. 4, the first vehicle 14 is shown traveling in one direction 212 on a road or roadway 204 of a bi-directional roadway 11. A roadway divider 13 separates traffic traveling in the opposite direction. The second vehicle 24 is shown traveling in the opposite direction 216 from the first vehicle 14.

Referring to the method 100 (FIG. 2), the method includes detecting, in a defined area 12, using an Internet of Things (IoT) enabled device, having a computer, in a first vehicle traveling in a direction, a second vehicle traveling in another direction within the defined area or vicinity 12, as in block 108, using a service orchestration layer 60 of a 5G telecommunications network 50.

The method includes collecting data 220 (FIG. 4) regarding the defined area 12 and the road condition 224 using the detected IoT devices in the first 14 and second vehicles 24, using a service orchestration layer 60 of a 5G telecommunications network 50 including information about the road condition, as in block 112. Collecting data can include information or data regarding the road condition in the vicinity. For example, such data can include location of the vicinity or area, location of the road condition, and the type of road condition, such as, for example, object, pothole, flooding, foreign object, etc.

In one example, the collected data can be collected, in whole or in part, at the control system, and communicated to one or more vehicle device. The control system acts as a master broadcaster providing evaluation of collected data and analysis of the data for communication to one or more vehicles. In another example, the collected data can be collected, in whole or in part, at the first vehicle IoT device and communicated to the second vehicle IoT device.

In one example, IoT devices using the 5G communications network can user cellular towers 19 as cellular base stations for implementing communications between cellular-enabled mobile devices.

In one example, the method can determine if additional data 226 (FIG. 4) is to be gathered for analysis, at block 116. When more data is to be captured, the method continues to block 120 where the method includes receiving additional data regarding a defined area for vehicular travel at a control system. The additional data can include data relevant to vehicles traveling in or through the defined area. Such additional data can include, for example, weather data. For example, news reports regarding an accident, or weather reports regarding flooding. The additional data can be collected and analyzed, all or in part, at a device of a vehicle, or in conjunction with or completely at the control system 70. When the method determines that additional data is not to be gathered, the method can continue to block 124.

The method includes analyzing 228 (FIG. 4) the collected data 220 including any additional data 226 to provide content data 232 related to driving conditions and the road condition 224 for the first and second vehicles 14, 24, respectively, as in block 124. The content data can relate to the driving conditions includes road conditions and driving conditions in the defined area.

In one example and embodiment, the analysis of the data including assessing the road condition for impact on a vehicle traveling in the defined area or vicinity. Such assessment can include assigning a risk score to a road condition or an event and establishing a threshold for advancing notification of the road condition when the threshold is met. In one example, a cumulative risk score can be assessed for a road condition which includes a sum of risk scores associated with a plurality of factors for a road condition. Such factors can include, for example, likelihood of distraction, likelihood of damage to a vehicle, likelihood of detouring a vehicle. The analysis can be generated at a device in a vehicle, or all or in part, at the control system 70 or in conjunction with the control system. Thereby, when the method determines a threshold risk score is met, the method can advance communication or a notification to a user or drive, or approve the advancement of a communication to a user or driver of a respective vehicle, and communicate the notification or the content data using the device of the vehicle, or in conjunction with the control system, to a driver or user of the respective vehicle.

For example, the device in the vehicle can assess and assign a risk score and communicate the content data to another vehicle device when a threshold is met, for example the second vehicle device, for a user or driver, or alternatively, all or in part, the control system can assess and assign a risk score and communicate the content data to the device in another vehicle and the device in the another vehicle can communicate the content data to the driver or user of the vehicle. The assessment can also include a filtering mechanism to filter notification, events, news storied that do not meet a threshold of importance for advancing a notification or communication to a user or driver. Thereby, according to the present disclosure, important or valuable data or information is advance or communicated to a user or drive. Further, according to the present disclosure, unnecessary or information lacking in value is not passed or communicated to a drive or user, and thus such overload or spamming of a driver or user is avoided.

Continuing with the method 100 shown in FIG. 2, the method includes exchanging the content data between the IoT devices of the first vehicle and the second vehicle in the defined area, at least from the first vehicle to the second vehicle, in real-time, as in block 128, using the service orchestration layer of a 5G telecommunications network 60. The real-time exchange of content data includes the first vehicle and the second vehicle being in the defined area or location.

For example, the first vehicle 14 device 20 can communicate 236 (FIG. 4) or send the content data to the second vehicle 24 device 20. In another example, the control system can communicate the content data to the first vehicle 14 device 20, after receiving the data from the first vehicle 14 device 20, and analyzing the data to generate the content data at the control system 70. Then, the first vehicle 14 device 20 can communicate the content data to the second vehicle 24 device 20. Thereby, the present disclosure provides real-time information related to the driving conditions to a vehicle traveling in another direction, the exchanging of the content data, using the service orchestration layer of the 5G telecommunications network.

Figure 3:
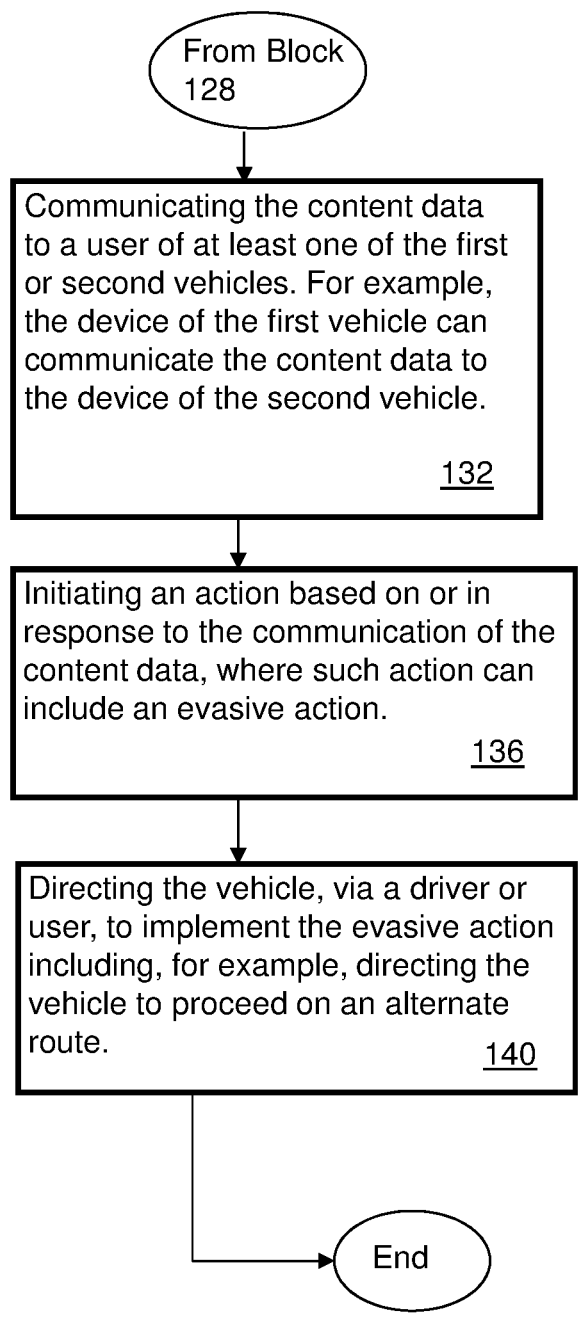
FIG. 3 is a flow chart continuing from the flow chart shown in FIG. 2 for the method shown in FIG. 2, according to an embodiment of the invention.

The method further includes communicating the content data to a user of at least one of the first or second vehicles. For example, the device 20 of the first vehicle 14 can communicate 236 the content data 232 (See FIG. 4) to the device 20 of the second vehicle 24, as in block 132 of FIG. 3. For example, the content data is communicated to a user or driver 15 of the second vehicle 24 using an audible output from a speaker 34 in the second vehicle.

In one example, the user can be an automated controller (for example, an autonomous vehicle control system, AI system, navigation system, etc. for use with autonomous vehicles) of the vehicle which in response to receiving the communication including the content data, takes an action 240 with the vehicle, such as a vehicular movement 244 or lack of movement, for example an evasive action 248, for example, moving the vehicle in a direction or another direction. Likewise, the driver can be defined as a person sitting behind the steering wheel of a vehicle and driving the vehicle. And the driver, upon receiving the communication including the content data can take an action 240, such as a vehicular movement or lack of movement, for example such as an evasive action. For example, an evasive action for a driver or a user controlling an automated vehicle can include moving the vehicle in a direction or another direction, or in another example avoiding an object or road condition, or taking an alternative route, changing the vehicle speed, such as speeding up or slowing down, and/or stopping the vehicle. Thus, a user, whether an automated controller of an autonomous vehicle, or a driver of a vehicle physically in the vehicle, can initiate an action based on or in response to the communication of the content data, where such action can include an evasive action, as referred to in block 136 of FIG. 3.

In one example, a driver or user can direct the vehicle to implement the evasive action including directing the vehicle to proceed on an alternate route. In another example, an evasive action can include a driver or user directing the vehicle to proceed on an alternative route for the vehicle, as in block 140 of the method 100 shown in FIG. 3.

Thus, embodiments according to the present disclosure can include initiating an evasive action based on the content data, in response to the communicating of the content data to a driver or a user of at least one of the first or second vehicles or a user of an autonomous vehicle. And, the evasive action can be initiated by the driver of the vehicle or the user.

In light of the above discussion, in one embodiment according to the present disclosure, a vehicle device can detect other vehicle devices in a vicinity, and in one example, the devices can communicate with a control system. A vehicle device can detect a road condition and collect data regarding the road condition. The device, in one example in conjunction with the control system, can analyze collected data about the road condition. Such analysis can include ascertaining, by ranking or weighting content of the data, importance or relevance of content to filter and ascertain content data which is relevant to the road condition and the user or driver operating the vehicle. Thereby, the method and system of the present disclosure includes receiving an input of data regarding a road condition and generating an output of content data based on the input data. Thus, the content data is intelligent information in the form of relevant content data. And thus, the method of the present disclosure does not just relay data such as road conditions or weather resulting in sending unwanted and/or unnecessary information in an undesirable frequency or amount. Thereby, the present disclosure provides content data to another vehicle which is valuable to the another vehicle and driver or user of an autonomous vehicle, from a first vehicle device.

Further, a device can communicate, e.g., send an output, regarding the road condition as content data to another vehicle traveling in another direction, using the device in a first vehicle, e.g., sharing the information using IoT enabled devices. A second device of a second vehicle can receive road condition data as content data, and the second device can communicate the road condition and content data to a user/driver using, for example, an audio output.

Additional Embodiments and Examples

In the embodiments according to the present disclosure the user can be a driver of the first or the second vehicles, or a controller of the first or second vehicles wherein at least one of the first and second vehicles is an autonomous vehicle.

In one embodiment according to the present disclosure, collecting data 220 can include information related to the geography, location of vehicles, local news, and also data collected from IoT devices coming from the opposite direction of the first vehicle, using the service orchestration layer of the 5G telecommunications network.

In general, in one embodiment of operation according to the present disclosure, a method and system include detecting, in the defined area, using the computer, Internet of Things (IoT) enabled devices in first vehicles traveling in the direction and second vehicles traveling in the another direction at the defined area. The method and system includes exchanging the content data with vehicles capable of receiving the content in both directions in the defined area, thereby providing real-time information related to driving conditions for the first and second vehicles. And, the method and system includes communicating the content data to drivers of respective first and/or second vehicles or respective users of autonomous vehicles.

It is understood that the features shown in FIG. 4 are functional representations of features of the present disclosure. Such features are shown in embodiments of the systems and methods of the present disclosure for illustrative purposes to clarify the functionality of features of the present disclosure.

Specifically, regarding the control system 70, the IoT devices 20 of the first and second vehicles can be in communication with the control system 70 via the communications network 50. The control system can an embodiment of, or all or part of, a master broadcaster or master broadcast system. In the embodiment of the control system shown in FIG. 1, the control system 70 includes a computer 72 having a database 76 and one or more programs 74 stored on a computer readable storage medium 73. In the embodiment of the disclosure shown in FIG. 1, the devices 20 communicate with the control system 70 and the one or more programs 74 stored on a computer readable storage medium 73. The control system includes the computer 72 having a processor 75, and which also has access to the database 76.

The control system 70 includes a storage medium 80 for maintaining a registration 82 of users and their devices for content analysis 228. Such registration can include user profiles 83, which can include user data supplied by the users in reference to registering and setting-up an account. In an embodiment, the method and system which incorporates the present disclosure includes the control system (generally referred to as the back-end) in combination and cooperation with a front end of the method and system, which can be the application 40. In one example, the application 40 is stored on a device, for example, the IoT device 20, and can access data and additional programs at a back end of the application, e.g., control system 70.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device, as in the example shown in FIG. 1 of devices 30 having the application 40. The application 40 is stored on the devices 20 and can access data and additional programs at the back end of the application, for example, in the program(s) 74 stored in the control system 70.

The program(s) 74 can include, all or in part, a series of executable steps for implementing the method of the present disclosure. A program, incorporating the present method, can be all or in part stored in the computer readable storage medium on the control system or, in all or in part, on a device 20. It is envisioned that the control system 70 can not only store the profile of users, but in one embodiment, can interact with a website for viewing on a display of a device, using the 5G network, or in another example the Internet, and receive user input related to the method and system of the present disclosure. It is understood that FIG. 1 depicts one or more profiles 83, however, the method can include multiple profiles, users, registrations, etc. It is envisioned that a plurality of users or a group of users can register and provide profiles using the control system for use according to the method and system of the present disclosure.

Regarding collection of data with respect to the present disclosure, such uploading or generation of profiles is voluntary by the one or more users, and thus initiated by and with the approval of a user. Thereby, a user can opt-in to establishing an account having a profile according to the present disclosure. Such approval also includes a user's option to cancel such profile or account, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner.

It is also understood that the method 100 according to an embodiment of the present disclosure, can be incorporated into (Artificial Intelligence) AI devices, which can communicate with respective AI systems, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, an AI device can be associated with an AI system, which can be all or in part, a control system and/or a content delivery system, and be remote from an AI device. Such an AI system can be represented by one or more servers storing programs on computer readable medium which can communicate with one or more AI devices. The AI system can communicate with the control system, and in one or more embodiments, the control system can be all or part of the AI system or vice versa.

It is understood that as discussed herein, a download or downloadable data can be initiated using a voice command or using a mouse, touch screen, etc. In such examples a mobile device can be user or an AI device can be used with consent and permission of users. Other examples of AI devices include devices which include a microphone, speaker, and can access a 5G network or the Internet, for example, a vehicle having a computer and having cellular or satellite communications, or in another example, IoT (Internet of Things) devices such as appliances having 5G, or Internet access.

Another Embodiment

The present disclosure can include a method and system which includes a GUI (Graphical User Interface) based interface termed "AI (Artificial Intelligence) based Mobility Manager and Advisor for vehicles" (AIMMA). The AIMMA described in the embodiments of the present disclosure can include the following. A method and system of the present disclosure can leverage data collected from devices placed in or on vehicles. The collected information can be analyzed, and insights derived and articulated. The method and system of the present disclosure includes the ability to classify the information collected using hierarchical or parallel classifier along with the in-scope boundary definition (for example, a situation valid for a few meters). The method and system can also be boundary sensitive, and include a classification module trained for circumstances like an accident, oil spill, unexpected potholes, etc. The method and system of the present disclosure is also envisioned as having the ability to form a dynamic master broadcaster or dynamic master broadcast system by computing the breadth and depth of the processed data/information. According to the method and system of the present disclosure, vehicles can be located coming from the opposite side on the road or before an incident, and selective information transferred across the devices to provide deeper information about the path ahead and obstacles. Using data collected and mapping the method and system can provide the situational context. The data collected from the devices can be shared to an AI based priority engine and the situation or road condition can be identified. Ability to get environmental details, current news, area specifications and other details and consider them while inferring. According to the present disclosure, the method and system can couple with an auto-drive mechanism or a car's or vehicle's control unit to feed the articulated insights in an autonomous mode. In a non-autonomous mode or human driving, the method and system can communicate to a driver using natural language to instruct a driver. In one embodiment, the system can perform a metadata match of real-time news classification with the entities and metadata extracted from IoT devices. For example, a metadata match can include matching a detected road condition in an area with a news feed regarding the same area. The data can confirm information, or the information from a vehicle can be assessed as likely to be true even if it cannot be confirmed, or the information can be concluded as contradictory to news data such as weather reports. Accordingly, a message can be broadcast using a dedicated or dynamic channel. In one example, the method and system can classify social events from the inputs received and conclude that a gathering or rally of some sort is occurring, and pass a message to other devices based on the time and situation. In another example, the method and system can monitor a cycle of an event and advise a driver to change a vehicle path considering the situational context or in an autonomous mode, auto switch the vehicle direction for the defined boundaries. The method and system can identify possible affected set of vehicles, IoT devices, possible area affected, and relate them with control policies, and use rule functions to authenticate information and select situational models. The method and system can also integrate and utilize expression maps, phrases used, gesture, and analyze conversions of input media streams to shape a type of content and generate metadata accordingly. In one example, speech can be converted to text for analysis by an AI system.

Advantages derived from the embodiments of the present disclosure include optimizing a smart self-driving mechanism by considering a pattern, nature, and personal characteristics of an upcoming road condition. Further, the systems and methods include avoiding road conditions, such as obstacles on the road ahead that helps the optimization in making driving strategies. The systems and methods of the present disclosure consider the time, situation, location and other parameters of vehicles which can be used and result in communications to vehicles resulting in more secure, predictive, optimal and improved driving and maneuvering of vehicles.

The method and system of the present disclosure provides advantages include computation of a situation or a road condition based on the collected information from a vehicle's sensors to articulate insights from the data collected. The method and system can orchestrate the situation and selectively multicast the information to vehicles while providing insights to the vehicles coming from the opposite direction using 5G orchestration. Thus, the present disclosure can collect data using resources of the vehicles moving on the road, and can determine insights regarding a situation on the roadway or a road condition outside the vehicle, and provides a mechanism for transferring these insights to the cars coming from opposite direction or towards the same direction of the vehicle before the incident location to help other driver and users to be aware about the situation or road condition ahead. The methods and systems according to the present disclosure provide a system and an apparatus working in the service orchestration layer of the 5G technology and co-existing with existing mobility monitoring tools which collect data for traffic and other details with existing 4G and compatible platforms, and can identify insights from data collected from IoT enabled devices placed on the vehicles. The information is collected from the devices via detecting the vehicles coming from the opposite direction to infer a situation or road condition in an area where the vehicle is moving to or proceeding or traveling to. The service orchestration layer of 5G telecom network detects for the IoT enabled devices placed in the vehicle. Once the devices are identified, orchestration layer issues the data collection instructions to the devices in the defined boundary for information exchange across entities. In response to the data exchange operation, a cognition enabled platform detects for the situation ahead on the road. This derived situation is accumulated to the vehicle's control system to take the movement automatically when operated in an autonomous mode. The apparatus collects the information related to the geography, history of the location where the vehicle is located, local news and data collected from IoT entities coming from the opposite direction, and the methods and systems provide an efficient way for mobility management and deeper information. The system communicates with the vehicles on the road, uses the resources placed on the vehicle to infer for the situation and passes the information insight to the vehicles going to that direction and alerts in case needed based on the situation detected. For example, an accident could have happened recently to which you are totally unaware or there could be oil spill. etc., on the road ahead. Vehicles from the opposite direction can capture this event, situation, road condition, and inform cars coming in other directions, using vehicle devices. Thus, the present disclosure provides cognition amplification of IoT enabled vehicles in a dynamic manner, or dynamic amplification in vehicular devices. A master broadcaster can be used based on knowledge breadth and depth and notifies others through dedicated or on the 5G channel and is sensitive to direction of vehicles. The master broadcaster can be periodically refreshed.

Another Embodiment

In one embodiment according to the present disclosure, a system and method can use an apparatus to initialize the method as a service in the service orchestration layer of 5G network. A server instance of the apparatus connects with various elements of 5G-service orchestration services that are used to collect information in later stages of operations. The initiated service connects with all the client instances that are activated in subscribed vehicles (vehicles can be static or in-motion). The connections can be made using in-band APIs (Application Programming Interface) or out-of-band implementation based on the service orchestration protocols. The service detects for the mobility of the IoT devices placed on the vehicles and requests for the data and associated contents to be delivered to the IoT device.

Devices can detect for a data collection request received from the service orchestration and instructs all the IoT enabled sensors to collect data and transmit data using a 5G allocated channel for the data. The devices can send the data to a service orchestration layer of the 5G communications network for further analysis, manipulation and boundary extraction. The service receives the data and performs movement-oriented data classification and saves the classified data to map objects. The map may contain vehicle details and collect insights that are used to generate data contextual insights.

Information for vehicle trajectory, speed, direction can be collected for an affected boundary detection, for example, for a defined area or location, or roadway, or roadway corridor. This boundary detection can be used further for information filtering and notification alerting to an autonomous vehicle's control unit.

Such information detection and collection can include, for example, a detected oil spill, etc. A dynamic lead library can be invoked to determine the time-to-situation context and information exchange is performed to get situational information where the vehicle is travelling. Based on discovered insights, the classifications are applied on data to segregate the data and relative situations.

A boundary for the validity of the situation is determined based on situation detected. A policy engine can map (and re-maps iteratively) an AI engine's information with local aspects, and history, along with different parameters to activate communication to vehicles coming from the opposite direction and instructs the driver or self-driving control unit to manage the plans accordingly when a vehicle is operated in autonomous mode. The system can update a historical database, including location, to auto-learn from experience. Thereby, the embodiments of the present disclosure collect data and analyze the data using cognitive analysis to filter the data and generate target data or content data for a vehicle coming in the opposite direction.

In one summary of the embodiments of the present disclosure, a system and method can include using IoT devices for sharing information, the present disclosure includes receiving data, analyzing the data, filtering the data for useful information/data for a vehicle in opposite direction, generating an output based on the analysis and filtering, and sending the output to the IoT device in vehicle traveling in opposite direction. The output is received at the IoT device on a second vehicle traveling in the opposite direction, and the method includes communicating the output to a driver or a user of autonomous vehicle.

Still further, the embodiments of the present disclosure include a system and method to observe and collect the real-time information from IoT enabled devices and vehicles in mobility and provides deeper insights for the road ahead. This includes data collection methodology from vehicles on the road coming from opposite direction to infer and analyze for the situation ahead on the road. The system and method is a targeted and a cognitive system which is closer to human like behavior to provide targeted results, e.g., content data, in contrast to a spamming of alerts to a vehicle device for communication to a user or driver. Such other vehicles can be coming from opposite direction on the road and information can be shared with relevant vehicles and drivers. Additionally, the present disclosure includes classifying information collected using hierarchical or parallel classifier along with the in-scope boundary definition (ex: situation valid for a few meters, or 'x' number of miles). AIMMA's boundary sensitive classification module can be trained for circumstances like accident, oil spill, unexpected potholes, etc. Further, vehicles can be located coming from opposite site on the road or before the incident and selective information transfer across the devices to provide deeper information about the path ahead and obstacles.

The present disclosure includes providing situational context using data collected and mapping. The data collected from the devices are shared to AI based priority engine and the situation is identified. The system and method can include performing a metadata match of the real-time news classification with the entities and Metadata extracted from IoT devices, for example, and accordingly broadcast the message using a dedicated or a dynamic channel. The method and system includes classifying social events from the inputs received and manipulate for the scenario to share, for example, communicating a message to other devices based on the time and situation.

Referring to FIG. 5, a system or computer environment 1000 includes a computer system 1010 shown in the form of a generic computing device. The method 100, for example, may be embodied in a program 1060, including program instructions, embodied on a computer readable storage device, or a computer readable storage medium, for example, generally referred to as computer memory 1030 and more specifically, computer readable storage medium 1050. Such memory and/or computer readable storage media includes non-volatile memory or non-volatile storage, also known and referred to non-transient computer readable storage media, or non-transitory computer readable storage media. For example, such non-volatile memory can also be disk storage devices, including one or more hard drives. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that the control system 70 can include all or part of the computer system 1010 and its components, and/or the control system can communicate with all or part of the computer system 1010 and its components as a remote computer system, to achieve the control system functions described in the present disclosure. It is also understood that the one or more computers or computer systems shown in FIG. 1 similarly can include all or part of the computer system 1010 and its components, and/or the one or more computers can communicate with all or part of the computer system 1010 and its components as a remote computer system, to achieve the computer functions described in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions. For example, a program embodying a method according to the present disclosure can be embodied in, or encoded in, a computer readable storage medium, or in another example, embodied or encoded in a non-transient computer readable storage medium.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Figure 6:
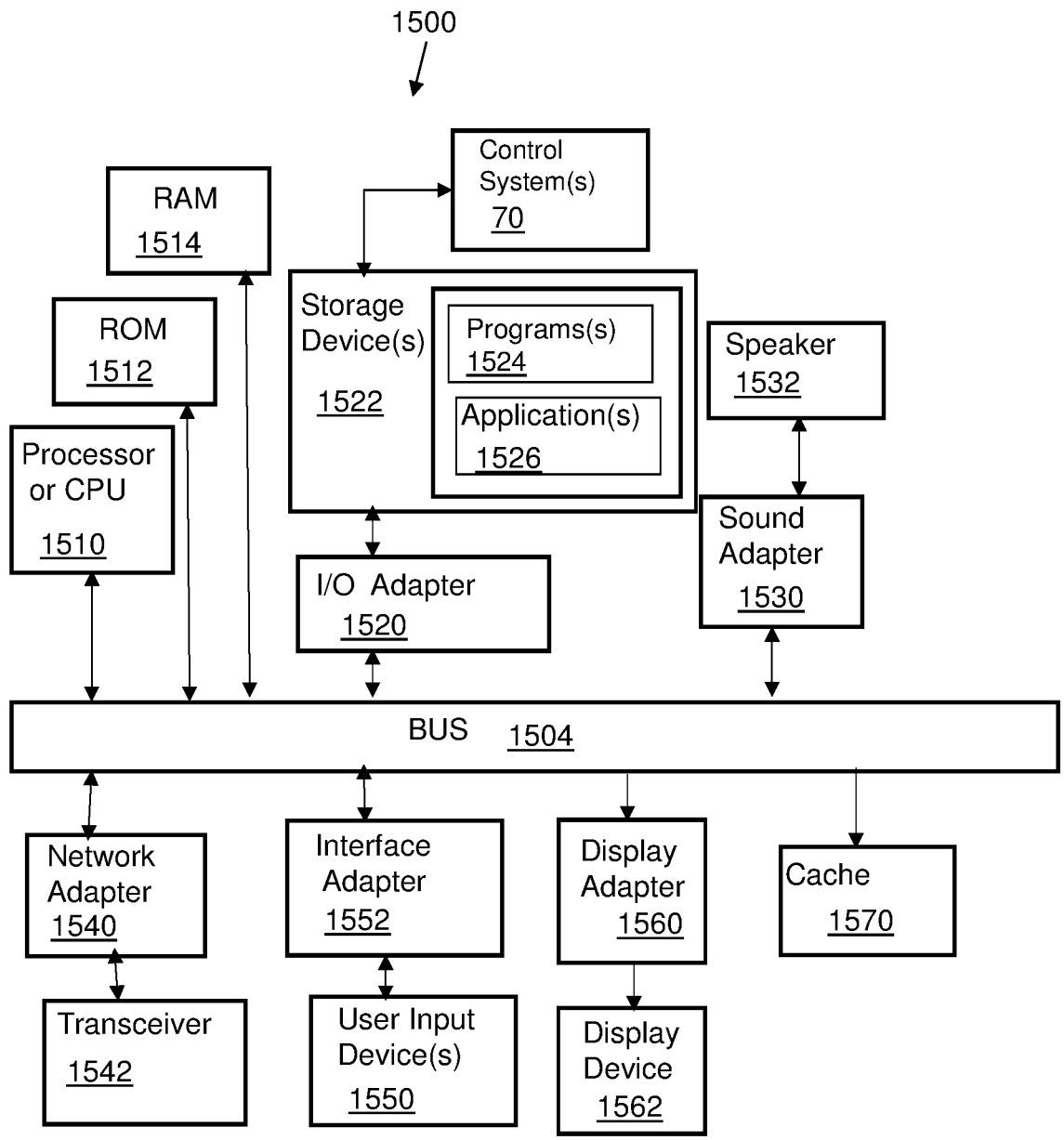
FIG. 6 is a schematic block diagram of a system depicting system components interconnected using a bus. The components for use, in all or in part, with the embodiments of the present disclosure, in accordance with one or more embodiments of the present disclosure.

Referring to FIG. 6, an example system 1500 for use with the embodiments of the present disclosure is depicted. The system 1500 includes a plurality of components and elements connected via a system bus 1504 (also referred to as a bus). At least one processor (CPU) 1510, is connected to other components via the system bus 1504. A cache 1570, a Read Only Memory (ROM) 1512, a Random Access Memory (RAM) 1514, an input/output (I/O) adapter 1520, a sound adapter 1530, a network adapter 1540, a user interface adapter 1552, a display adapter 1560 and a display device 1562, are also operatively coupled to the system bus 1504 of the system 1500.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. The storage device can include, for example, but not limited to, a hard drive or flash memory and be used to store one or more programs 1524 or applications 1526. The programs and applications are shown as generic components and are executable using the processor 1510. The program 1524 and/or application 1526 can include all of, or part of, programs or applications discussed in the present disclosure, as well vice versa, that is, the program 1524 and the application 1526 can be part of other applications or program discussed in the present disclosure. The storage device can communicate with the control system 70 which has various functions as described in the present disclosure.

A speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

One or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices. The user input devices 1550 are used to input and output information to and from the system 1500.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
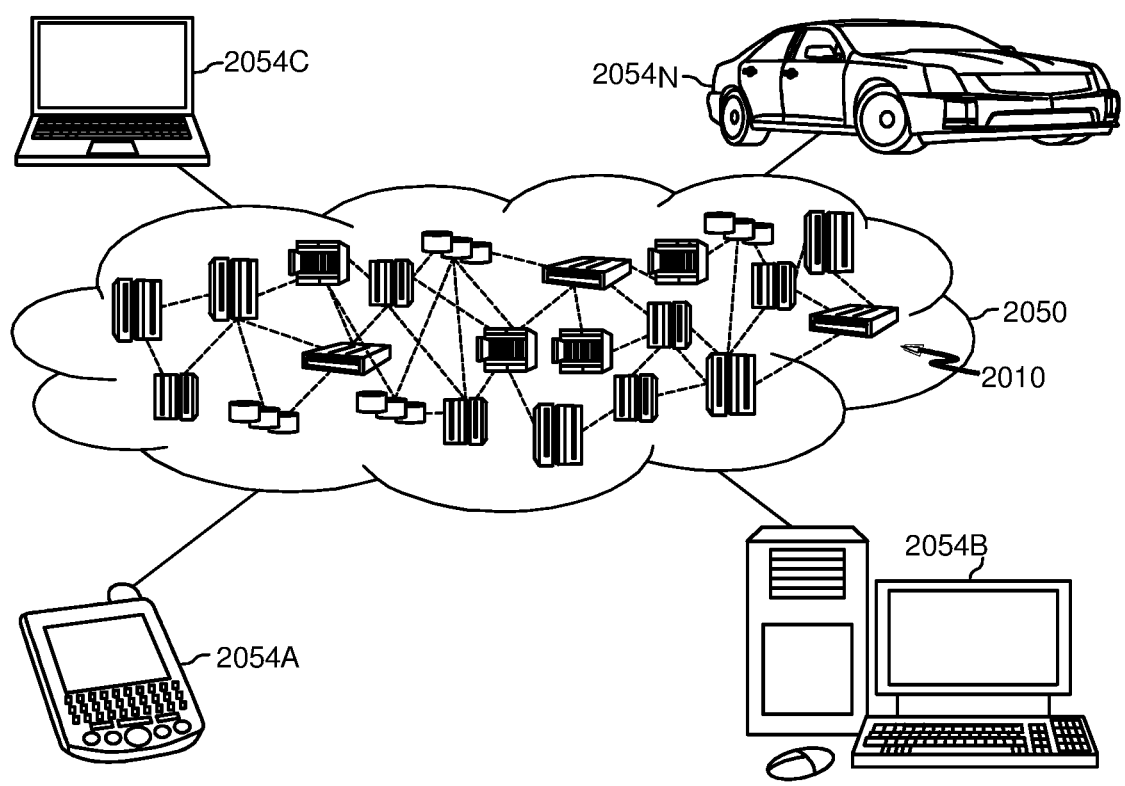
FIG. 7 is a block diagram depicting a cloud computing environment according to an embodiment of the present invention.

Referring now to FIG. 7, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 7 are intended to be illustrative only and that computing nodes 2010 and cloud computing environment 2050 can communicate with any type of computerized device over any type of network and/or network addressable connection (e.g., using a web browser).

Figure 8:
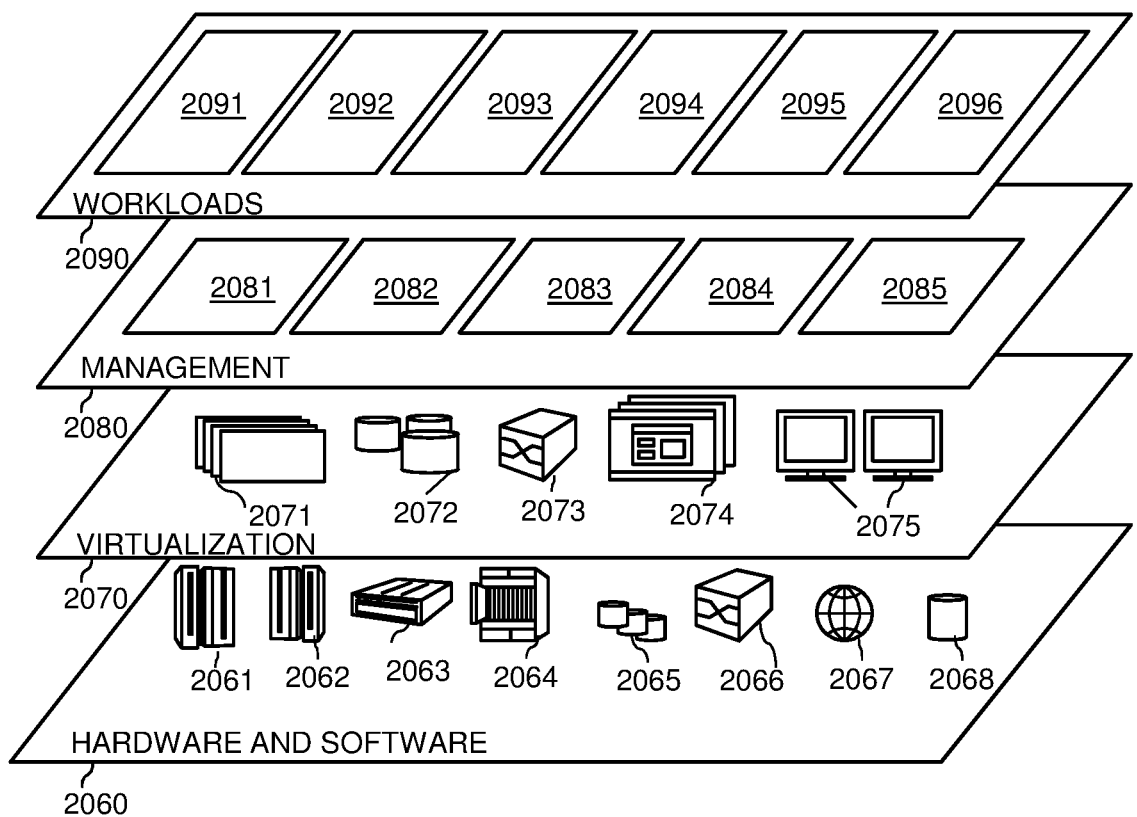
FIG. 8 is a block diagram depicting abstraction model layers according to an embodiment of the present invention.

Referring now to FIG. 8, a set of functional abstraction layers provided by cloud computing environment 2050 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and cognitive data analytics for vehicular devices using a 5G (fifth generation cellular network technology) telecommunications network 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method including cognitive data analytics for communication between vehicular devices using a 5G (fifth generation cellular network technology) telecommunications network, comprising:

detecting, in a defined area, using an Internet of Things (IoT) enabled device, having a computer, in a first vehicle traveling in a direction, a second vehicle traveling in another direction in the defined area, the defined area including a road for vehicular travel and the defined area includes a road condition;

collecting data in the defined area, regarding the road condition, using the detected IoT devices in the first and second vehicles, using a service orchestration layer of a 5G telecommunications network;

analyzing the collected data to provide content data related to driving conditions including the road condition, and related to driving conditions in the defined area for the first and second vehicles;

exchanging the content data between the IoT devices of the first vehicle and the second vehicle in the defined area, at least from the first vehicle to the second vehicle, in real-time, thereby providing real-time information related to the driving conditions to a vehicle traveling in another direction, the exchanging of the content data, using the service orchestration layer of the 5G telecommunications network; and communicating the content data to a user of at least one of the first or second vehicles.

2. The method of claim 1, wherein the user is a driver of the first or the second vehicles, or a controller of the first or second vehicles wherein at least one of the first and second vehicles is an autonomous vehicle.

3. The method of claim 1, wherein the real-time exchange of content data includes the first vehicle and the second vehicle being in the defined area.

4. The method of claim 1, wherein the another direction is an opposite direction from the direction of the first vehicle.

5. The method of claim 1, further comprising:
collecting data related to the geography, location of vehicles, local news, and data collected from IoT devices coming from the opposite direction of the first vehicle, using the service orchestration layer of the 5G telecommunications network.

6. The method of claim 1, wherein the content data related to the driving conditions includes road conditions and driving conditions in the defined area.

7. The method of claim 1, further comprising:
detecting, in the defined area, using the computer, Internet of Things (IoT) enabled devices in first vehicles traveling in the direction and second vehicles traveling in the another direction at the defined area;
exchanging the content data with vehicles capable of receiving the content in both directions in the defined area, thereby providing real-time information related to driving conditions for the first and second vehicles; and
communicating the content data to drivers of respective first and/or second vehicles or respective users of autonomous vehicles.

8. The method of claim 1, wherein vehicular devices including computers are located in respective vehicles and communicate with a remote computer.

9. The method of claim 8, wherein the vehicular devices are at least part of respective navigations systems in respective vehicles.

10. The method of claim 1, further comprising:
initiating an evasive action based on the content data, in response to the communicating of the content data to a driver or a user of at least one of the first or second vehicles or a user of an autonomous vehicle.

11. The method of claim 10, wherein the evasive action is initiated by the driver or the user.

12. The method of claim 11, wherein the driver is a person physically located in the vehicle seated behind the wheel of the first or the second vehicle.

13. A system for cognitive data analytics for communication between vehicular devices using a 5G (fifth generation cellular network technology) telecommunications network, which comprises:
a computer system comprising: a computer processor, a computer-readable storage medium, and program instructions stored on the computer-readable storage medium being executable by the processor, to cause the computer system to perform functions, by the computer, comprising, the following functions to:
detect, in a defined area, using an Internet of Things (IoT) enabled device, having a computer, in a first vehicle traveling in a direction, a second vehicle traveling in another direction in the defined area, the defined area including a road for vehicular travel and the defined area includes a road condition;
collect data in the defined area, regarding the road condition, using the detected IoT devices in the first and second vehicles, using a service orchestration layer of a 5G telecommunications network;
analyze the collected data to provide content data related to driving conditions including the road condition, and related to driving conditions in the defined area for the first and second vehicles;
exchange the content data between the IoT devices of the first vehicle and the second vehicle in the defined area, at least from the first vehicle to the second vehicle, in real-time, thereby providing real-time information related to the driving conditions to a vehicle traveling in another direction, the exchanging of the content data, using the service orchestration layer of the 5G telecommunications network; and
communicate the content data to a user of at least one of the first or second vehicles.

14. The system of claim 13, wherein the user is a driver of the first or the second vehicles, or a controller of the first or second vehicles wherein at least one of the first and second vehicles is an autonomous vehicle.

15. The system of claim 13, wherein the real-time exchange of content data includes the first vehicle and the second vehicle being in the defined area.

16. The system of claim 13, wherein the another direction is an opposite direction from the direction of the first vehicle.

17. The system of claim 13, further comprising:
collecting data related to the geography, location of vehicles, local news, and data collected from IoT devices coming from the opposite direction of the first vehicle, using the service orchestration layer of the 5G telecommunications network.

18. The system of claim 13, wherein the content data related to the driving conditions includes road conditions and driving conditions in the defined area.

19. The system of claim 13, further comprising:
detecting, in the defined area, using the computer, Internet of Things (IoT) enabled devices in first vehicles traveling in the direction and second vehicles traveling in the another direction at the defined area;
exchanging the content data with vehicles equipped to receive the content in both directions in the defined area, thereby providing real-time information related to driving conditions for the first and second vehicles, the vehicles having devices using 5G; and
communicating the content data to drivers of respective first and/or second vehicles or respective users of autonomous vehicles.

20. A computer program product for cognitive data analytics for communication between vehicular devices using a 5G (fifth generation cellular network technology) telecommunications network, the computer program product comprising a computer readable storage medium having program instructions embodied therewith, the program instructions executable by a computer to cause the computer to perform functions, by the computer, comprising the functions to:
- detect, in a defined area, using an Internet of Things (IoT) enabled device, having a computer, in a first vehicle traveling in a direction, a second vehicle traveling in another direction in the defined area, the defined area including a road for vehicular travel and the defined area includes a road condition;
- collect data in the defined area, regarding the road condition, using the detected IoT devices in the first and second vehicles, using a service orchestration layer of a 5G telecommunications network;
- analyze the collected data to provide content data related to driving conditions including the road condition, and related to driving conditions in the defined area for the first and second vehicles;
- exchange the content data between the IoT devices of the first vehicle and the second vehicle in the defined area, at least from the first vehicle to the second vehicle, in real-time, thereby providing real-time information related to the driving conditions to a vehicle traveling in another direction, the exchanging of the content data, using the service orchestration layer of the 5G telecommunications network; and
- communicate the content data to a user of at least one of the first or second vehicles.

* * * * *